(12) United States Patent
Bertocchi

(10) Patent No.: US 12,446,608 B2
(45) Date of Patent: Oct. 21, 2025

(54) MACHINE FOR EXTRACTING PUREE, OR JUICE, FROM FOOD PRODUCTS

(71) Applicant: Alessandro Bertocchi, Parma (IT)

(72) Inventor: Alessandro Bertocchi, Parma (IT)

(*) Notice: Subject to any disclaimer, the term of this patent is extended or adjusted under 35 U.S.C. 154(b) by 922 days.

(21) Appl. No.: 17/634,803

(22) PCT Filed: Aug. 10, 2020

(86) PCT No.: PCT/IB2020/057514
§ 371 (c)(1),
(2) Date: Feb. 11, 2022

(87) PCT Pub. No.: WO2021/028819
PCT Pub. Date: Feb. 18, 2021

(65) Prior Publication Data
US 2022/0273017 A1    Sep. 1, 2022

(30) Foreign Application Priority Data

Aug. 14, 2019 (IT) .................. 102019000014784

(51) Int. Cl.
*A47J 19/02* (2006.01)
*A23N 1/00* (2006.01)
*A23N 1/02* (2006.01)

(52) U.S. Cl.
CPC ............... *A23N 1/02* (2013.01); *A23N 1/003* (2013.01); *A47J 19/027* (2013.01); *A23N 1/00* (2013.01)

(58) Field of Classification Search
CPC ......... A47J 19/027; A23N 1/00; A23N 1/003; A23N 1/02
USPC .................................. 99/404, 510, 511, 513
See application file for complete search history.

(56) References Cited

U.S. PATENT DOCUMENTS

| 2,088,657 | A | * | 8/1937 | Lindley | ................... B30B 9/207 100/98 R |
| 4,643,085 | A | | 2/1987 | Bertocchi | |
| 5,669,288 | A | * | 9/1997 | Zittel | ..................... A23N 12/04 99/360 |
| 2008/0000500 | A1 | | 1/2008 | Bertocchi | |
| 2014/0373736 | A1 | | 12/2014 | Bertocchi | |

FOREIGN PATENT DOCUMENTS

| CN | 106889632 A | | 6/2017 | |
| KR | 101855617 B1 | * | 5/2018 | ............... A23N 1/02 |

* cited by examiner

*Primary Examiner* — Reginald Alexander
(74) *Attorney, Agent, or Firm* — Maschoff Brennan

(57) ABSTRACT

A machine for extracting puree, or juice, from a food product, comprises a machine body provided with an inlet for introducing a food product. Downstream of the inlet, an extraction section is provided comprising a sieve with a plurality of holes, and a rotor configured to rotate about a rotation axis, operated by a motor through a motor shaft, to apply a centrifugal force to the food product to cause the same to be separated into a main product, comprising the puree, and/or the juice, which passes through the holes and is discharged from the extraction section through a first outlet, and a waste product comprising the skins, and the seeds, which, does not pass through the holes of the sieve, and is discharged through a second outlet. Further, a displacement device is configured to move the sieve with respect to the machine body along a longitudinal direction.

20 Claims, 9 Drawing Sheets

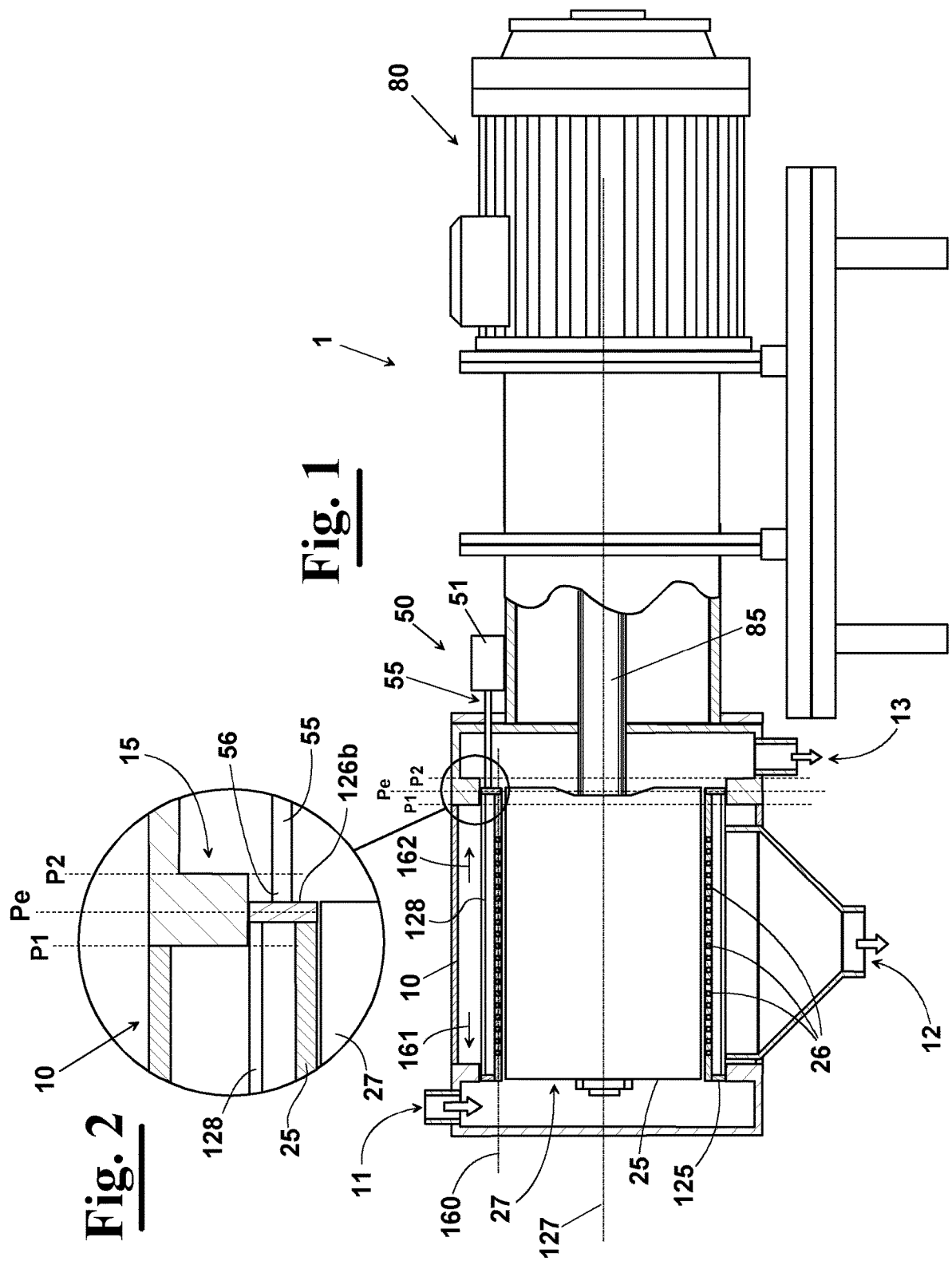

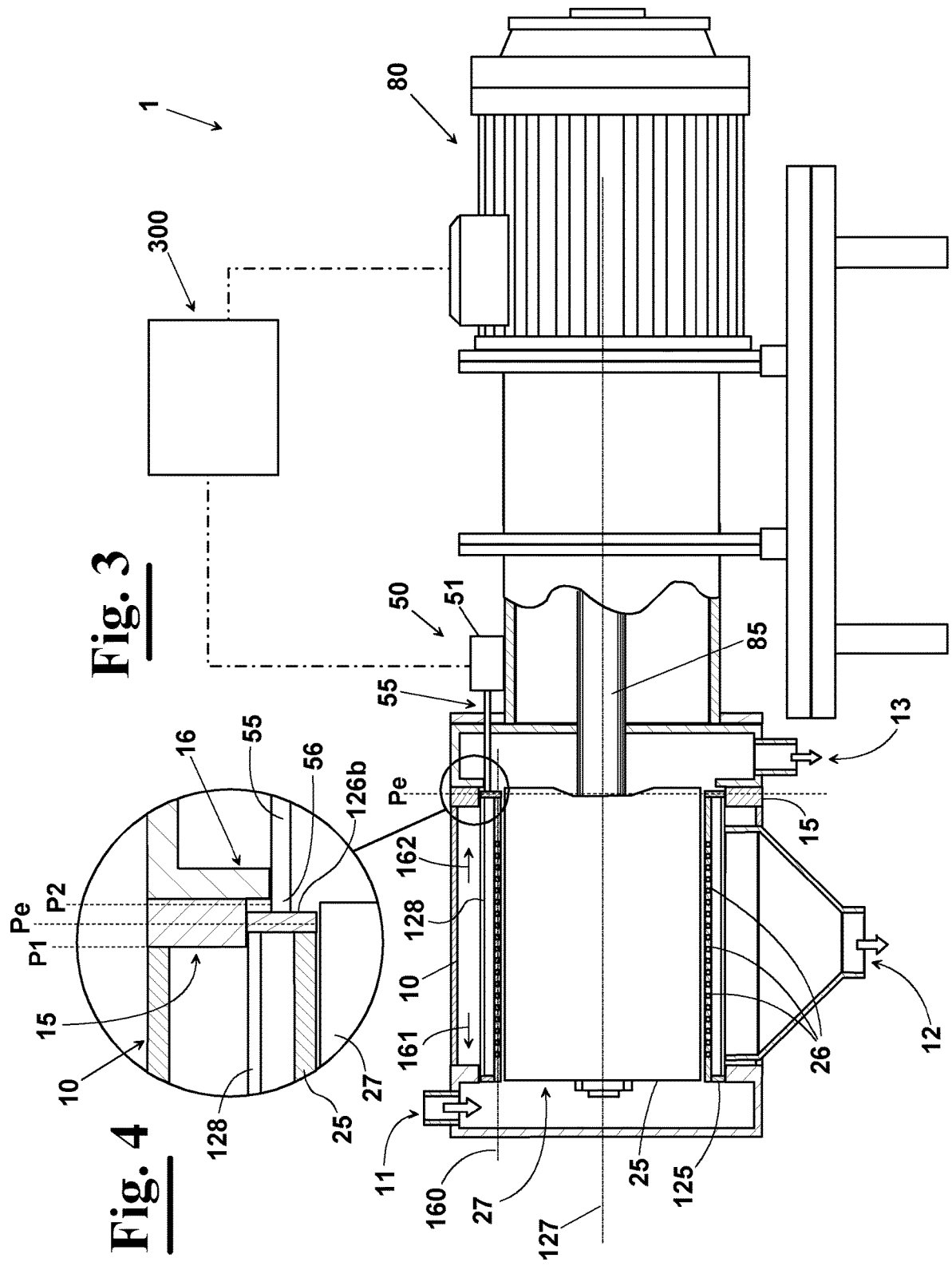

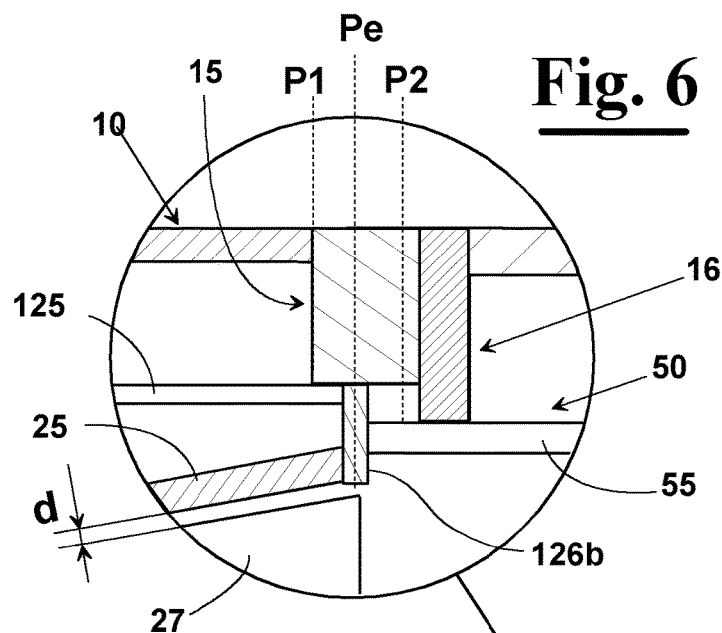
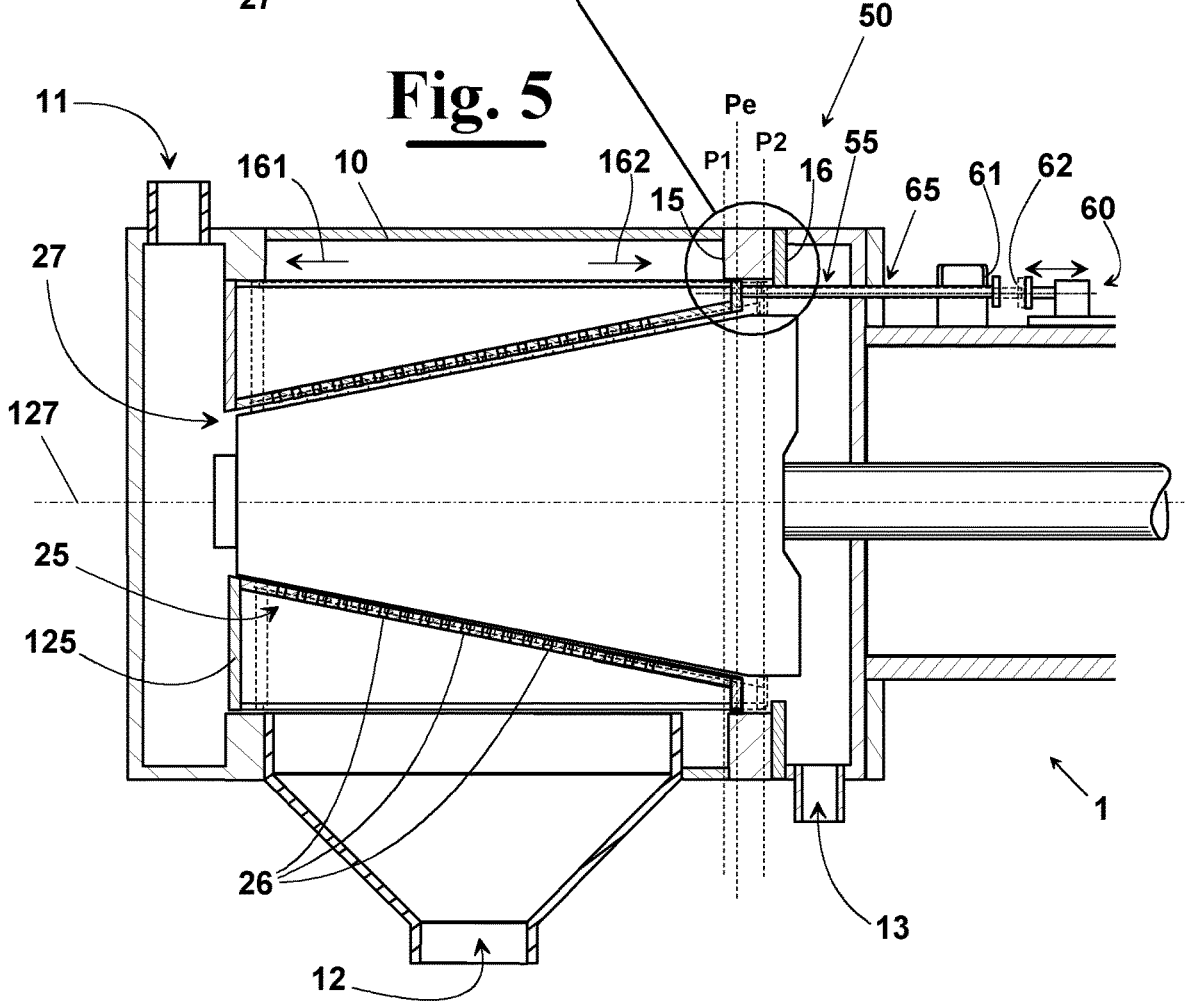

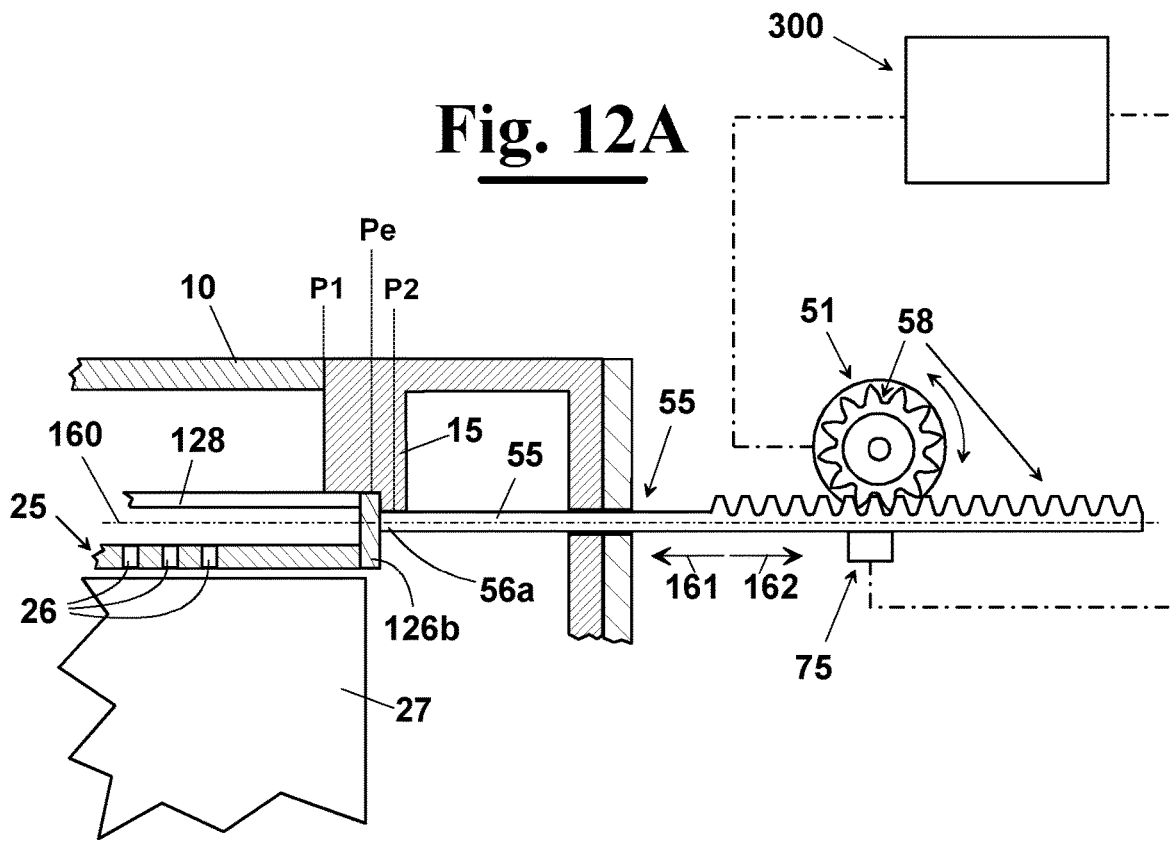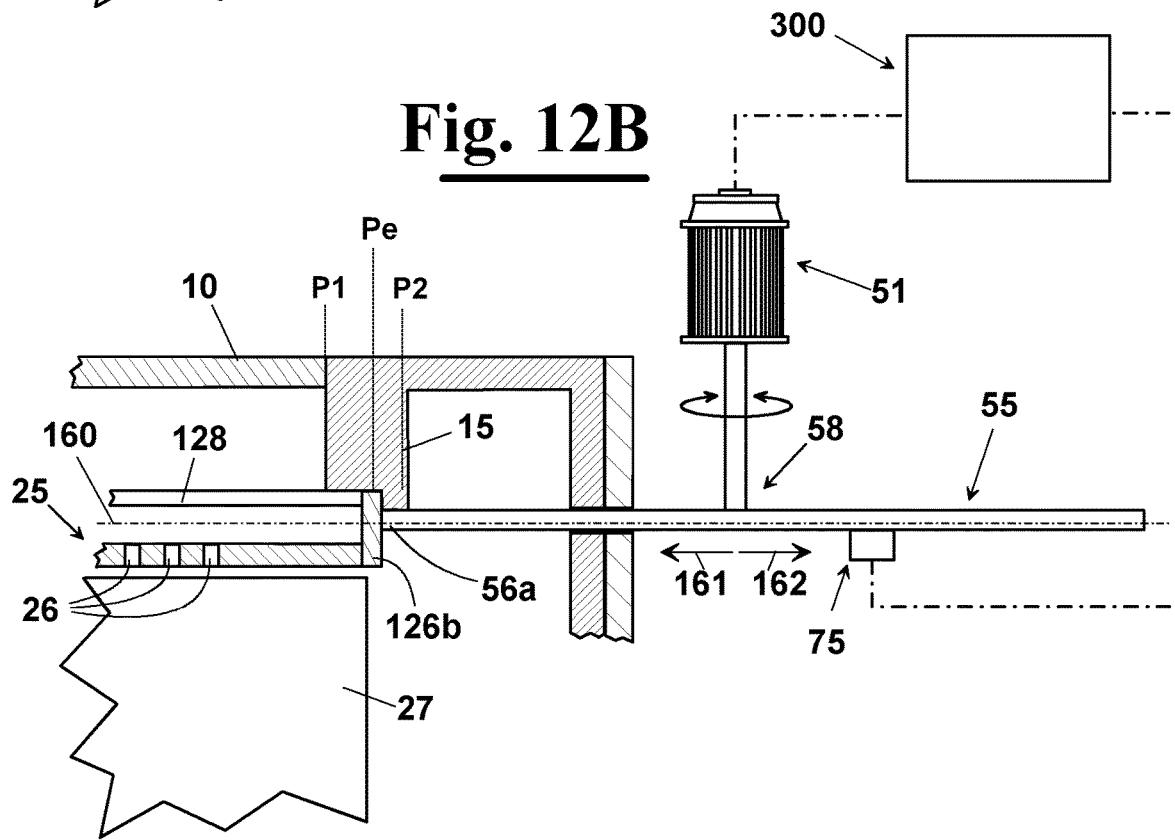

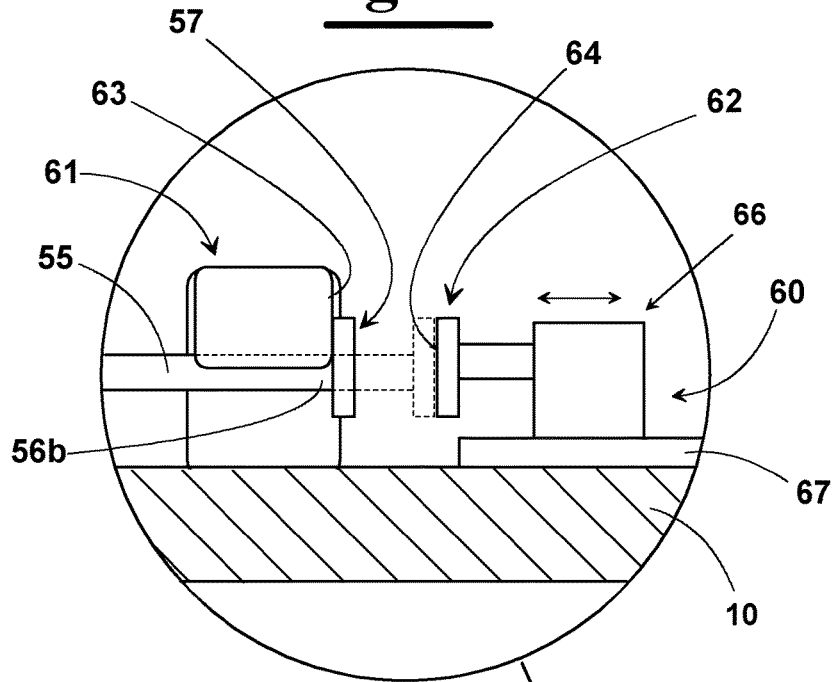
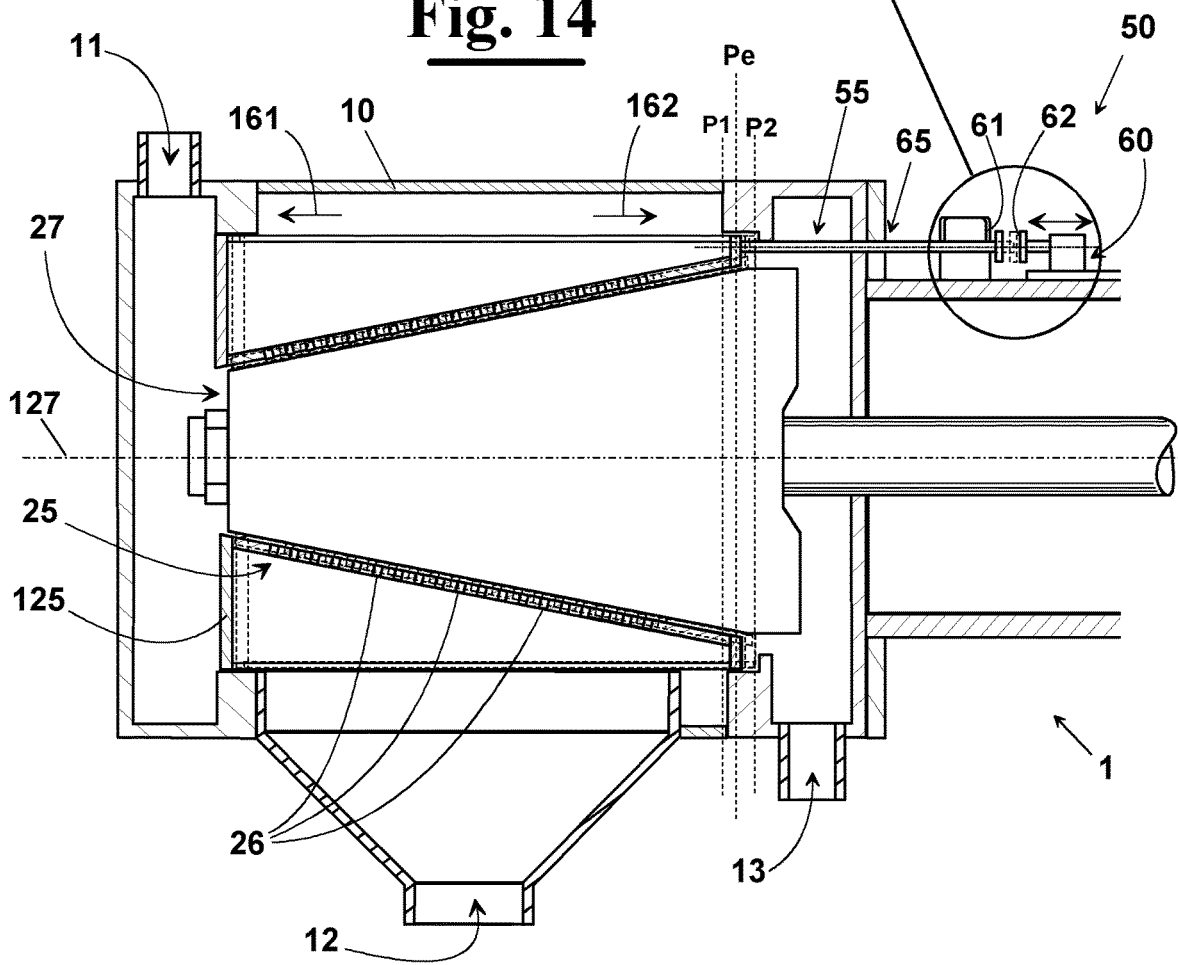

MACHINE FOR EXTRACTING PUREE, OR JUICE, FROM FOOD PRODUCTS

FIELD OF THE INVENTION

The present invention relates to a machine for the food industry, and in particular relates to a machine for extracting puree, or juice, from food products of vegetable, or animal, origin.

Furthermore, the invention relates to a method for adjusting the axial position of a sieve with respect to the machine body, and in particular the rotor, of a machine for extracting puree, or juice, from a food product.

BACKGROUND OF THE INVENTION

As known, the industrial extraction of juice and puree mainly from vegetable products, such as fruits and vegetables, but also from food product of animal origin, such as meat and fish, is carried out by rotating machines, such as rough extractors and refiner extractors.

Normally, the rotating machines of prior art comprise in particular a rotor which is caused to rapidly rotate about a rotation axis by a motor group. More precisely, the rotor is peripherally provided with a series of blades and is mounted within a perforated sheet, or sieve, having cylindrical, or conical, shape.

During its rotation about the rotation axis, the rotor applies a centrifugal force on the treated product that causes the same to selectively pass through the sieve.

In this way, the starting food product is divided in a main product containing the puree and the juice, which passes through the holes of the sieve and is discharged from the machine through a first outlet to be subject, in case, to successive treatments, and a waste product mainly containing the skins and the seeds, which does not pass through the holes of the sieve and that advances axially to the machine up to reach a second outlet through which is discharged from the machine.

For example, rotors provided with curvilinear blades inclined towards the rotation direction, as for example described in U.S. Pat. No. 4,643,085, rotors with "straight" blades, and rotors with blades inclined towards the direction opposite to the direction of rotation of the rotor.

The machines for extracting puree and juice from food products are periodically subject to cleaning operations in order to remove the fragments of food product that has been treated in a previous working cycle, and that adhered to the parts of the machine, because they can pollute the product of a successive working cycle, in particular in the case that between a cycle and the following one, a different food product is treated.

These cleaning operations, which are, normally, repeated more times in the same working day, even every two hours, are manually carried out by workers. Therefore, in many cases, the workers more times in the same day have to move by hands the sieve from an advanced position, in which is arranged during the working configuration, to a withdrawn position in order to be able to wash the chamber where the puree is collected as well as all the parts that are hidden by the sieve to the devices that deliver the cleaning liquid. An analogous operation also this carried out by hands by workers, each time that the machine has to be subject to other interventions of ordinary, or extraordinary, maintenance, in such a way to reach the different parts that have to be checked.

The workers, once that the intervention of maintenance is finished, currently provide, also in this case by hands, to position the sieve back in the aforementioned advanced position before starting a new working cycle, that means to turn on the motor, which causes a rotation of the rotor.

More precisely, at the correct work position, the sieve, or more precisely the support on which the same is mounted, is supported by a support guide of which the machine is provided, and that has a predetermined length. Therefore, if the sieve, or as anticipated above, the support of the sieve, is not arranged in the correct position with respect to the support guide, the same "falls down" from the correct position and hits the rotor with severe consequences for these parts of the machine which are unavoidably damaged.

A particular condition for the machine occurs when both the rotor and the sieve have a conical shape. In fact, in this case, as can be easily understood, modifying the relative position between the sieve and the rotor also the distance (d) between them is modified. In particular, if the distance (d) is less than a predetermined threshold value, the sieve can hit the rotor thus causing a high wear of the blades of the rotor, or even a blocking of the machine. Therefore, in this case, besides preventing the sieve from falling down from the support flange, it is also necessary to prevent the same from going into contact with the rotor.

However, since, as anticipated above, the aforementioned operations are manually carried out, frequently the sieve is not arranged in the correct position with respect to the machine, but in one of the positions described above, which are potentially dangerous for the product and/or for the different parts of the machine.

Examples of machines for extracting puree, or juice, from food products with the aforementioned drawbacks are described in US2008/000500, US2014/373736 and CN106889632.

SUMMARY OF THE INVENTION

It is, therefore, an object of the present invention to provide an improved machine for extracting puree and/or juice from a food product, in particular of vegetable origin, which is able to guarantee that the sieve is correctly positioned within the machine, and in particular with respect to the rotor, in such a way to avoid that the above mentioned drawbacks of the prior art machines, each time that the machine is turned on after having subject the same to an intervention of ordinary maintenance, for example for cleaning the same, or extraordinary, or after having replaced a worn sieve with a new one.

It is also an object of the present invention to provide a machine for extracting puree and/or juice from a food product, in particular of vegetable origin, which allows to maximize the yield, i.e. the ratio between the quantity of the extracted main product, in particular puree and juice, and the quantity of waste, in particular seeds, skins, etc.

These and other objects are achieved by the for extracting puree, or juice, from a food product, said machine comprising a machine body provided with:
  an inlet for introducing the food product;
  an extraction section configured to separate, during an extraction configuration, said food product in a main product comprising said puree, or juice, and a waste product, within said extraction section a sieve being mounted having a cylindrical, or conical, shape and provided with a plurality of holes, and a rotor having cylindrical, or conical, shape positioned within said sieve and configured to rotate about a rotation axis in such a way to apply a centrifugal force on said food product to force the same against said sieve and to separate the same in said main product, which passes through said holes of said sieve, and is discharged through a first outlet, and said waste product, which, instead, does not pass through said holes of said sieve and is discharged through a second outlet positioned downstream of said first outlet with respect to the advancing direction of the food product in said extraction section;

a motor operatively connected to said rotor and configured to cause said rotation of said rotor about said rotation axis;

whose main characteristic is to provide, furthermore, a displacement device configured to move said sieve with respect to said machine body along a direction longitudinal to said machine body in order to position said sieve in a determined working position (Pe) positioned between a predetermined first limit position (P1) and a predetermined second limit position (P2), when the extraction section does not work in the aforementioned extraction configuration.

Other technical characteristics of the present invention and related embodiments are set out in the dependent claims.

In particular, the aforementioned displacement device can comprise an actuator selected from the group comprised of:
a pneumatic actuator;
a hydraulic actuator;
a mechanical actuator;
an electromechanical actuator.

According to another aspect of the invention, a method for adjusting the position of a sieve in a machine for extracting puree, or juice, from a food product, comprises the steps of:
providing a machine for extracting puree, or juice, from a food product comprising:
a machine body having an inlet for introducing the food product;
an extraction section configured to separate, during an extraction configuration, said food product in a main product comprising said puree, or juice, and a waste product, in said extraction section a sieve having a cylindrical, or conical, shape being mounted and provided with a plurality of holes, and a rotor having cylindrical, or conical, shape positioned within said sieve and configured to rotate about a rotation axis in such a way to apply a centrifugal force on said food product to force the same against said sieve and separate the same in said main product, which passes through said holes of said sieve, and is discharged through a first outlet, and said waste product, which, instead, does not pass through said holes of said sieve and is discharged through a second outlet positioned downstream of said first outlet with respect to the advancing direction of the food product in said extraction section;
a motor operatively connected to said rotor and configured to cause said rotation of said rotor about said rotation axis;
and wherein a displacement step is, furthermore, provided to move said sieve with respect to said machine body along a longitudinal direction in a first displacement direction and in a second displacement direction opposite to the first, to position said sieve in a determined working position (Pe) when the extraction section does not work in the aforementioned extraction configuration, said determined working position (Pe) being arranged between a predetermined first limit position (P1), and a predetermined second limit position (P2).

Advantageously a calibration step is, furthermore, provided to determine an ideal working position (Pe) of said sieve with respect to said machine body, at which said sieve is positioned at the end of each intervention of ordinary, or extraordinary, maintenance.

BRIEF DESCRIPTION OF THE DRAWINGS

The invention will be now illustrated with the following description of an exemplary embodiment thereof, exemplifying but not limitative, with reference to the attached drawings wherein:

FIG. 1 diagrammatically shows a partially sectioned side elevational view a machine, according to the invention, for extracting puree and/or juice;

FIG. 2 diagrammatically shows an enlargement of a portion of the machine of FIG. 1 to highlight some technical characteristics;

FIG. 3 diagrammatically shows a partially sectioned side elevational view of an alternative embodiment of the machine of FIG. 1;

FIG. 4 diagrammatically shows an enlargement of a portion of the machine of FIG. 3 to highlight some technical characteristics;

FIG. 5 diagrammatically shows a partially sectioned side elevational view of a portion of another alternative embodiment of the machine of FIG. 1;

FIG. 6 diagrammatically shows an enlargement of a portion of the machine of FIG. 5 to highlight some technical characteristics;

FIGS. 12A and 12B show two possible alternative embodiments of the displacement device according to the present invention;

FIG. 14 shows still another alternative embodiment of the machine of FIG. 1 in an extraction configuration;

FIG. 15 diagrammatically shows an enlargement of the adjustment device provided by the machine of FIG. 14.

DETAILED DESCRIPTION OF SOME EXEMPLARY EMBODIMENTS OF THE INVENTION

Figure 7:
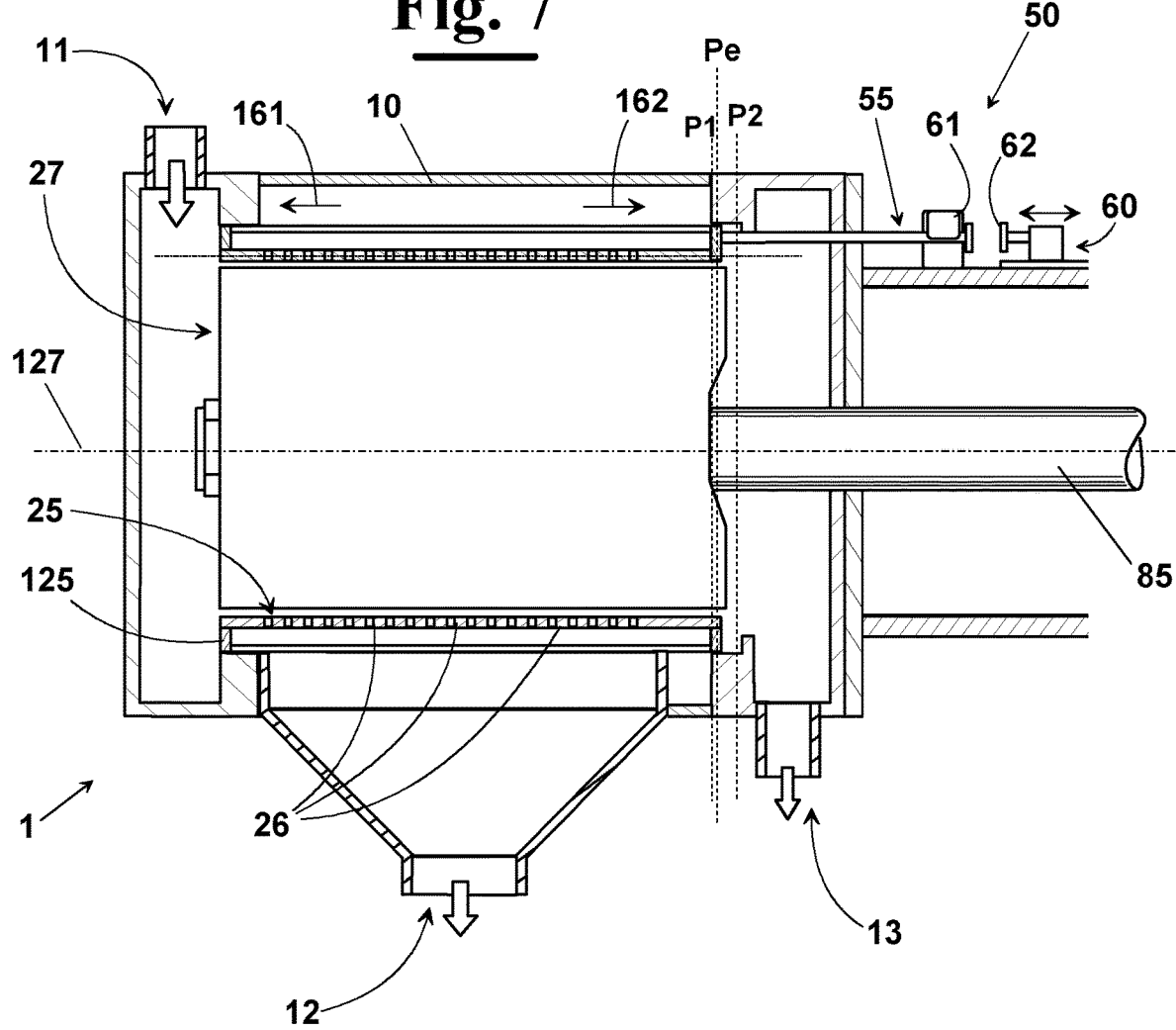
FIG. 7 diagrammatically shows a partially sectioned side elevational view of a portion of a further alternative embodiment of the machine of FIG. 1 in an extraction configuration.

As diagrammatically shown in FIG. 1, a machine 1 for extracting puree, or juice, from a food product, according to the invention, comprises a machine body 10 provided with an inlet 11 for introducing a food product. Downstream of the aforementioned inlet 11, an extraction section 20 is provided configured to separate, during an extraction configuration, the food product in inlet, into a main product comprising the puree, or the juice, and a waste product. In particular, within the extraction section 20 a sieve 25 having a cylindrical, or conical, shape provided with a plurality of holes 26, and a rotor 27, also this having a cylindrical, or conical, shape and mounted within the sieve 25 are arranged. More precisely, during the aforementioned extraction configuration, the rotor 27 is configured to rotate about a rotation axis 127, driven by a motor 80 by a motor shaft 85, in such a way to apply a centrifugal force on the aforementioned food product. The rotor 27 can comprise a plurality of radial blades, as for example described in US4643085. More precisely, the centrifugal force produced by the blades of the rotor 27 on the treated food product pushes this against the sieve 25. This causes the food product to be separated into a main product, which comprises puree, and/or juice, which passes through the holes 26 of the sieve 25, and is discharged from the extraction section through a first outlet 12, and a waste product, which comprises the skins, and the seeds of the food product, which, instead, does not pass through the holes 26 of the sieve 25, and is, therefore, discharged from the extraction section 20 through a second outlet 13 arranged downstream of the first outlet 12 along the advancing direction of the food product within the extraction section 20. In particular, the sieve 25 can be mounted on a support 125 comprising a first and at least a second flange portion 126a, 126b, connected with each other by a straight connection portion 128. According to the present invention, the machine 1, furthermore, provides a displacement device 50 configured to displace the sieve 25 with respect to the machine body 10 along a longitudinal direction 160. In particular, the displacement device 50 is arranged to position the sieve 25 in a determined working position (Pe) when the extraction section 20, before starting the motor 80, or anyway, in general, when the machine 1 does not work in the aforementioned extraction configuration, but in a maintenance configuration. More in particular, the aforementioned working position (Pe) is the position corresponding to an ideal working situation, because this is the position of the sieve 25, in particular with respect to the rotor 27, that is able to assure to reach the maximum yield of machine 1 in main product and, at the same time, to work in conditions of absolute safety. The aforementioned determined working position (Pe) is placed between a predetermined first limit position (P1), beyond which the displacement of the sieve 25 along the longitudinal direction 160, in the first displacement direction 161, is prevented, and a predetermined second limit position (P2), beyond which the displacement of the sieve 25 by the displacement device 50, is prevented again along the longitudinal direction 160, but in the second displacement direction 162, opposite to the first one.

In particular, as diagrammatically shown in the FIGS. 1 and 2, in a first possible embodiment, the first and the second limit positions (P1) and (P2) can be the positions beyond which the sieve 25, or more precisely a flange 126b of the support 125 on which the same is, advantageously, mounted, is not positioned on the support flange 15, and is, therefore, arranged in an incorrect position which can jeopardize the correct functioning of the extraction section 20, because the sieve can "fall" from the aforementioned support flange 15 and hit the rotor 27, with severe consequences if, in these conditions, the machine 1 would be arranged in the extraction configuration.

In the alternative embodiment of FIGS. 3 and 4, instead, the machine body 10, downstream of the support flange 15, in the second direction 162, in addition to the aforementioned support flange 15, has an additional flange 16, which protrudes towards the internal of the machine 1 and, therefore, represents an obstacle to the displacement of the sieve 25 in the second direction 162 along the aforementioned longitudinal direction 160. In this case, the second limit position (P2) can be chosen by the manufacturer or the producer of juice, or puree, on the basis of determined working conditions.

In the further alternative embodiment that is diagrammatically shown in the FIGS. 5 and 6, the sieve 25 and the rotor 27 have a conical shape, in particular with the same conicity. In this case, the predetermined first limit position (P1) is again the position, in the first direction 161, beyond which the sieve 25, or more precisely the flange 126b of the support 125, is no more supported by the support flange 15. The second limit position (P2), instead, can be considered to be the position at which the distance "d" between the sieve 25 and the blades of the rotor 27 is less than a predetermined threshold value d* and, therefore, there is the risk that they can hit with each other thus producing a premature wear of the above mentioned components, or even to damage the same.

In all the cases described above, for the correct functioning of the machine 1 it is essential that the sieve 25 does not go beyond the aforementioned limit positions (P1) and (P2).

Advantageously, the aforementioned displacement device 50 is arranged to act, that means to apply a determined force, at the second flange portion 126b, in such a way to move the sieve 25, in the first, or in the second direction 161, or 162.

In particular, the displacement device 50 can comprise an actuation portion 55 having a first end portion 56a integral to the aforementioned second flange portion 126b of the support 125 at which is arranged to apply a determined force arranged on the longitudinal direction 160 and oriented in the first, or in the second direction 161, or 162, in such a way to cause a displacement of the sieve 25 in the corresponding direction. More in particular, the displacement device 50 can provide a driving portion 51 configured to drive the aforementioned actuation portion 55 to cause a movement along the longitudinal direction 160 in the first, or in the second, displacement direction 161, or 162.

As diagrammatically shown in the FIGS. 12A and 12B, the driving portion 51 can provide a motor arranged to transmit the movement to the actuation portion 55 by driving members 58. These, in particular, are configured to transform the rotation motion of the motor shaft in a translation motion, in such a way to cause the aforementioned translation along the longitudinal direction 160 of the sieve 25. For example, the driving members 58 can provide a coupling between a rack and a pinion (FIG. 12A), or between two gear wheels (not shown, but, anyway, easy to understand by the skilled person in the art from what is shown in FIG. 12B). In particular, the motor 51 can be able to rotate in a rotation direction to cause the actuation portion 55 and, therefore, the sieve 25, to rotate in the first displacement direction 161, and in a second rotation direction, opposite to the first to cause, by driving members 58, the aforementioned translation of the actuation portion 55 and, therefore, of the sieve 25, in the second displacement direction 162.

In particular, as still diagrammatically shown in the FIGS. 12A and 12B, a position sensor 75 can be provided arranged to detect the position of the sieve 25, directly, or through an actuation portion 55 of the displacement device 50, and to send corresponding position data to the control unit 300. This elaborates the detected data and compares the same with the stored data related to the first and the second limit positions (P1, P2) and commands to block the displacement device 50 when these data coincide with each other, or when their difference is less than a predetermined threshold value. This operation can be carried out at each replacement of the sieve 25, which is mounted in the machine 1, for example to be replaced, because worn with the use, with a new sieve having the same characteristics, in particular the same size, or with a different sieve, that means having different size, for example a different diameter of the holes.

Figure 13A:
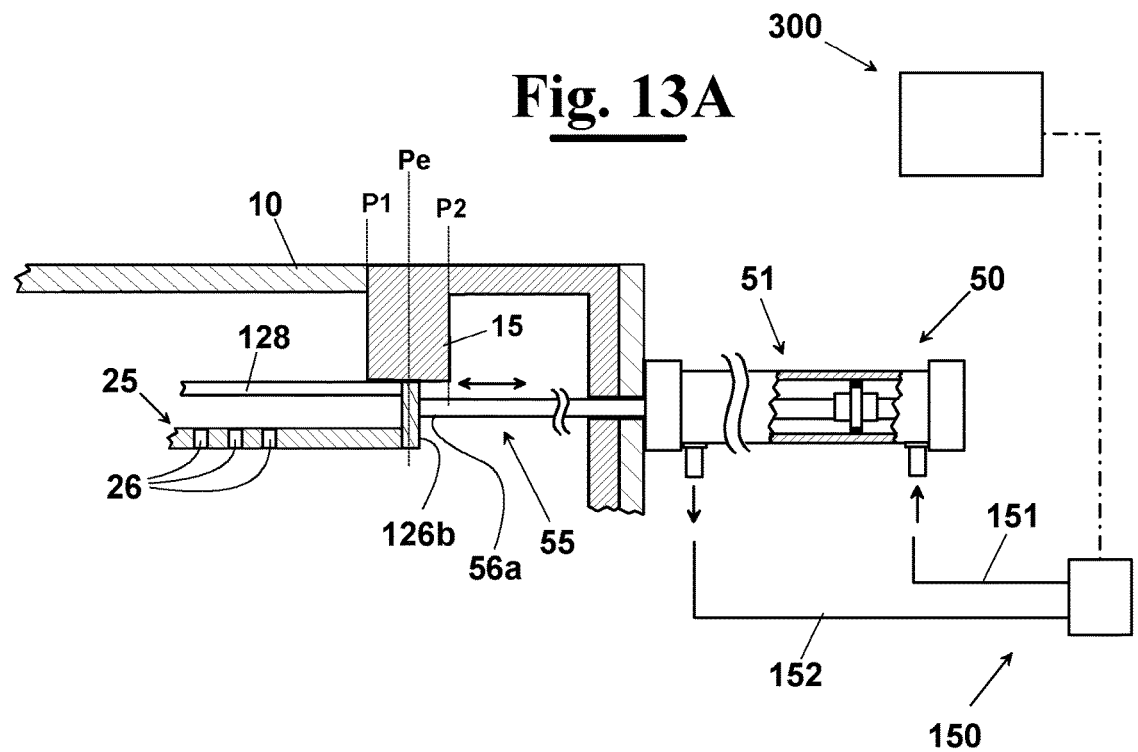
FIGS. 13A and 13B show another possible alternative embodiment of the displacement device in two different working positions.
Figure 13B:
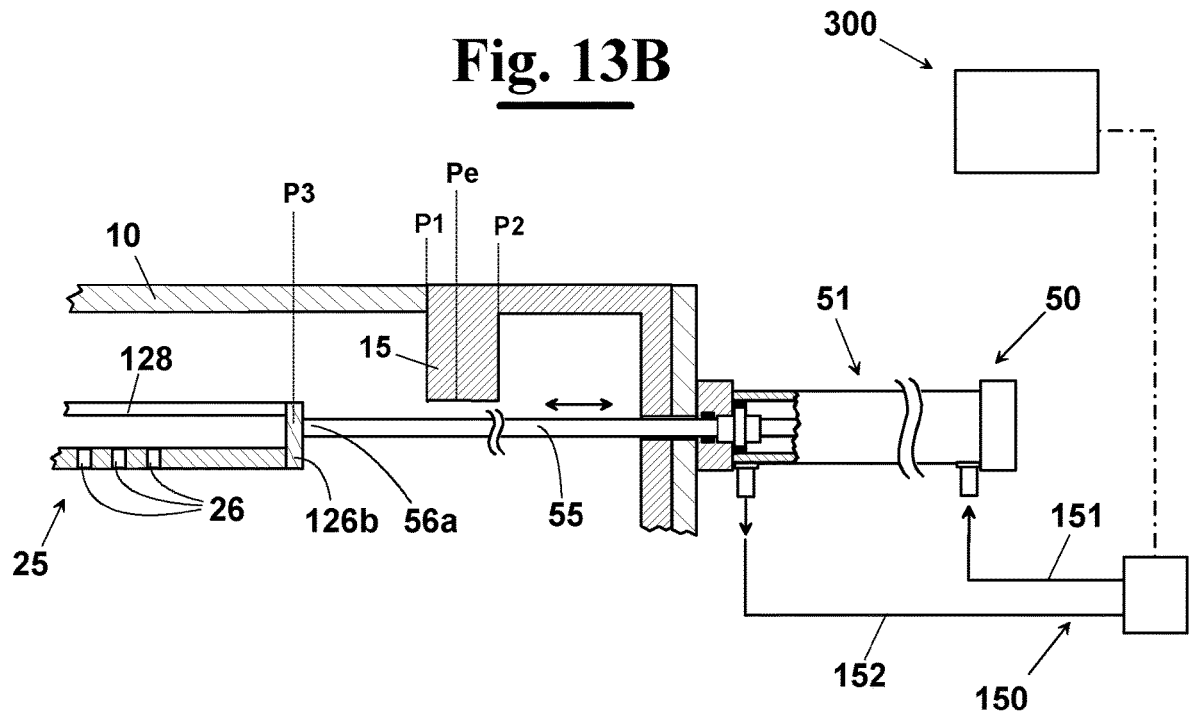

As diagrammatically shown in the FIGS. 13A and 13B, the driving portion 51 can provide an actuator, in particular a double acting actuator. Also in this case a control unit 300 can be, advantageously, provided operatively connected to the actuator 51 to drive the translation of the stem, operatively connected to the actuation portion 55, in a first, or a second, displacement direction 161, or 162. More precisely, the control unit 300 can be operatively connected to a hydraulic, or pneumatic, circuit 150, which feeds a first branch 151 of the actuator 51, or the opposite branch 152 to cause the actuation portion 55 and, therefore the sieve 25, to translate in the first, or the second displacement direction 161, or 162.

In a possible embodiment of the invention, the machine 1 provides a first stop element 61 configured to stop mechanically the displacement of the sieve 25 by the displacement device 50, when the sieve 25 reaches the predetermined first limit position (P1). Advantageously, a second stop element 62 is, furthermore, provided configured to stop, also this mechanically, the displacement of the sieve 25, when this reaches the predetermined second limit position (P2). More in detail, the first and the second stop elements 61 and 62 are configured to stop mechanically the displacement along the longitudinal direction of the sieve 25 with respect to the machine body 10, respectively, in the first displacement direction, and in the second displacement direction. In particular, the actuation portion 55, in addition to the aforementioned first end 56a, can be provided with a second end 56b provided with a contrast element 57. The first and the second stop elements 61 and 62 can be provided with respective abutment surfaces 63 and 64 against which the aforementioned contrast element 57 is arranged to abut when the sieve 25 is moved in the first displacement direction 161, and in the second displacement direction 162, respectively.

According to an alternative embodiment of the invention, diagrammatically shown in FIG. 3, the aforementioned predetermined first limit position (P1) and/or the aforementioned second limit position (P2) are stored in a control unit 300.

In a particular embodiment of the invention, the sieve 25 and the rotor 27 have a conical shape, preferably with the same conicity. In this case, as can be easily understood by the skilled person in the art, the displacement of the sieve 25 with respect to the machine body 10 by the displacement device 50, increase, or decreases, la distance (d) between the sieve 25 and the rotor 27. Therefore, at working position (Pe) the sieve 25 is positioned at a determined position (d) from rotor 27. In this kind of machines, in order to have a high yield, it is necessary that the distance of the sieve 25 from the blades of the rotor 27 is as less as possible. However, such a distance has to be sufficient to avoid that the sieve 25 and the blades of the rotor 27 can hit with each other during the extraction step, situation that would unavoidably result in a quick wear of the mechanical parts and that would damage, in particular, the sieve 25 and, therefore, jeopardize the quality of the final product, or even causing a blocking of machine 1.

Figure 8:
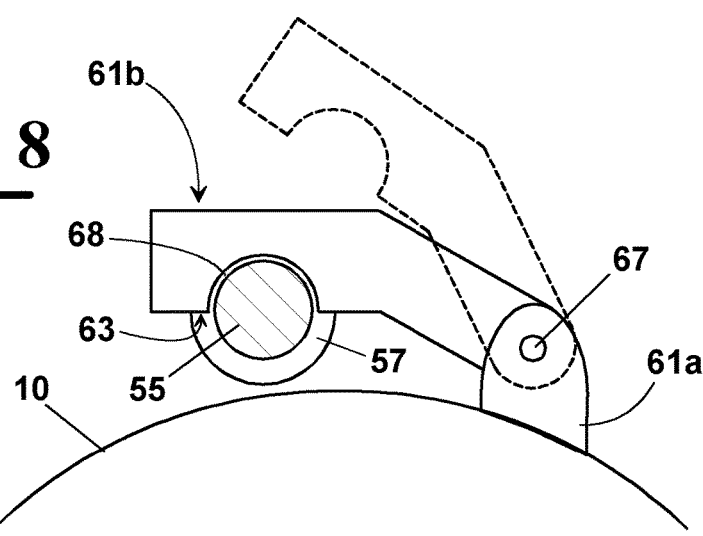
FIG. 8 diagrammatically shows an enlargement of the blocking device, provided by an alternative embodiment of the machine of FIG. 7, in a blocking configuration.
Figure 9:
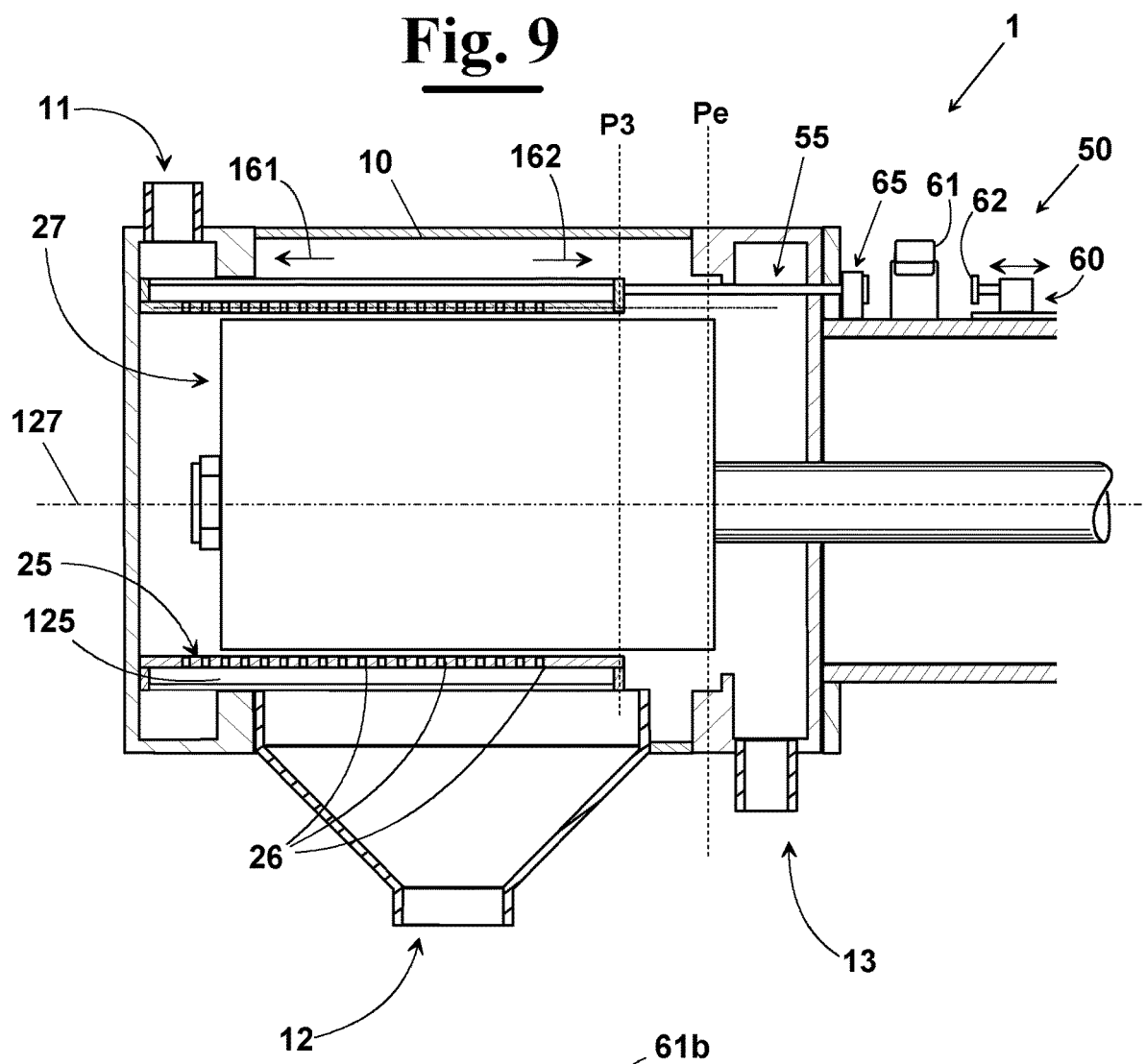
FIG. 9 diagrammatically shows a partially sectioned side elevational view of the machine of FIG. 7 in a maintenance configuration.
Figure 10:
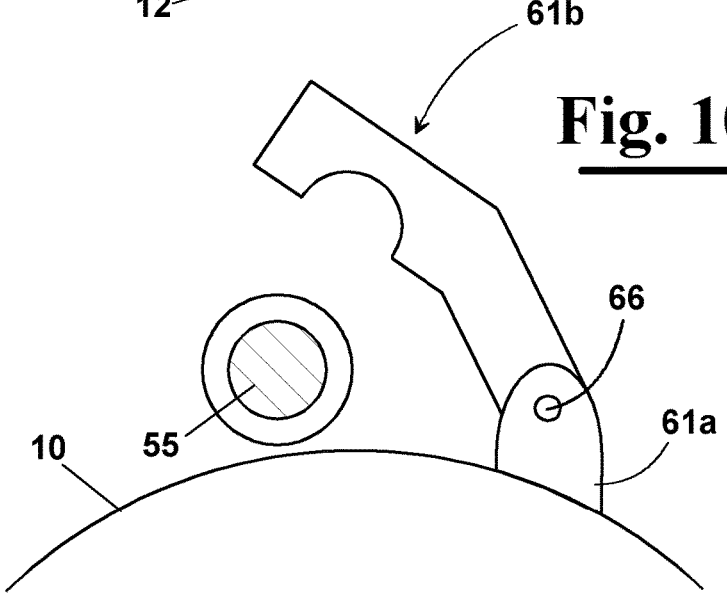
FIG. 10 diagrammatically shows an enlargement of the blocking device in the unblocking position corresponding to the situation shown in FIG. 9.

As diagrammatically shown in the FIGS. 7 to 10, the first stop element 61 can be provided mobile between a blocking position (FIGS. 7 and 8), in which the aforementioned abutment surface 63 is positioned along the aforementioned longitudinal direction 160, and at the predetermined first limit position (P1) the contrast element 57 is arranged to abut against the aforementioned abutment surface 63, and a unblocking position (FIGS. 7 and 8). More in detail, in the unblocking position, the aforementioned abutment surface 63 is external to the longitudinal direction, and, therefore, the displacement of the sieve 25 in the first displacement direction 161 is not stopped at the aforementioned predetermined first limit position (P1), can be, therefore, exceed. In this case, the displacement device 50 can be configured to move the sieve 25 along the aforementioned longitudinal direction 160 in the first displacement direction 161 in addition to the aforementioned first position (P1). More in detail, the displacement of the sieve 25 in addition to the predetermined first limit position (P1) can be carried out in order to subject the machine 1, and in particular the sieve 25 and the rotor 27, to interventions of ordinary, or extraordinary, maintenance, in particular in order to wash these components and/or other parts of the machine which are hidden by the sieve 25 as well as the internal surface of the machine body 10. In particular, the displacement device 50 can be configured to displace the sieve 25, for example, up to reach a predetermined third limit position (P3) (see FIG. 9). As diagrammatically shown in FIG. 9, a third stop element can be provided configured to stop mechanically the displacement device 50 when the sieve 25 reaches the aforementioned third limit position (P3).

Figure 11:
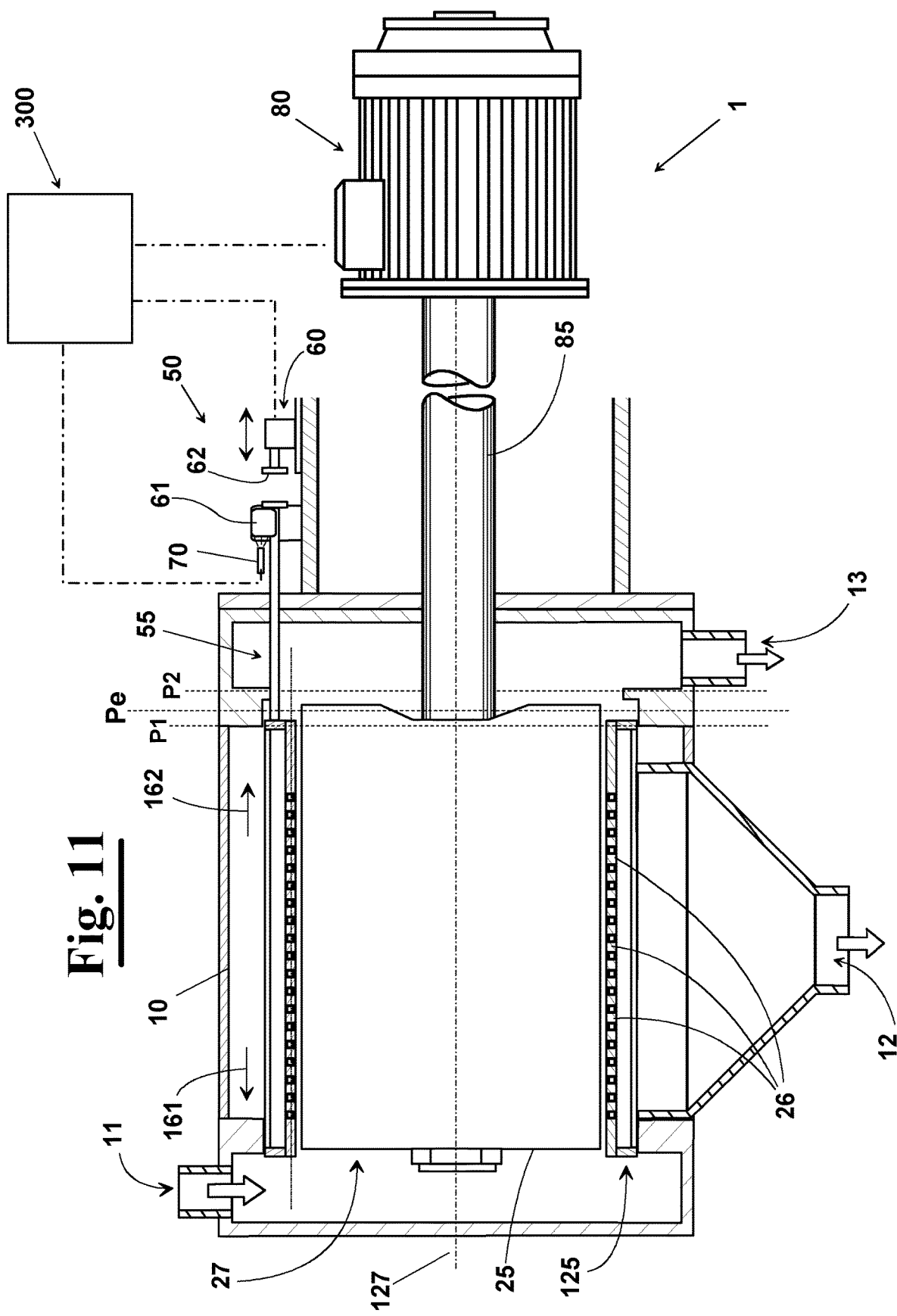
FIG. 11 diagrammatically shows a partially sectioned side elevational view of a portion of still another alternative embodiment of the machine of FIG. 1 in an extraction configuration.

In particular, as diagrammatically shown in FIG. 11, at least a presence sensor 70 can be provided configured to detect if the first stop element 61 is positioned, or not, in the blocking position. More in particular, a control unit 300 can be, furthermore, provided operatively connected to the presence sensor 70. The control unit 300 is, preferably, configured to prevent the motor 80 from being operated if the presence sensor 70 detects that the first stop element 61 is arranged in the aforementioned blocking position. In this way it is avoided that the extraction section 20 can be started, that means arranged in the extraction configuration, when the sieve 25, after an intervention of ordinary, or extraordinary, maintenance, has not been positioned back in the correct position. Therefore, the particular technical solution provided by the invention allows to avoid that the final product, i.e. the puree, or the juice, can be polluted by seeds and skins of the starting vegetable product.

Advantageously, as diagrammatically shown in FIG. 15, an adjustment device 60 can be provided configured to set at least the aforementioned second limit position (P2). More in particular, the adjustment device 60 can be configured to cause the first and/or the second stop element 61, 62 to slide along the aforementioned longitudinal direction 160 in such a way to bring the second limit position (P2) near the first limit position (P1) or to move one away from the other. According to an embodiment, the aforementioned stop element 62 can be fixed to a carriage 66, which is slidingly mounted on a rail 67 oriented along the longitudinal direction 160.

According to another aspect of the invention, before starting the production of puree and/or juice by machine 1, i.e. before definitively arranging the same in the extraction configuration, it is possible to provide a calibration step in order to determine the ideal axial position of the sieve 25, in particular the position at which the yield of the machine 1 is maximum, and, at the same time, the sieve 25 is not arranged in one of the aforementioned positions that are potentially dangerous for the product and/or the different components of the machine 1. Once the aforementioned calibration step of the machine 1 is finished, the sieve 25 is positioned at the aforementioned ideal working position (Pe). Then the machine 1 can be started. During the calibration step at least the aforementioned second limit position (P2) of the sieve 25 with respect to the machine body 10 is, furthermore, determined. This calibration step can be, in particular, carried out every time that a change of the sieve 25 is made, in particular because of a change in the treated product with respect to the previous production run.

According to an embodiment that is not shown in the figures for simplicity, the displacement device 50 can provide a first and at least a second actuation portion configured to apply a respective force along the aforementioned axial direction 160 on the sieve 25. More in detail, the first and the second actuation portions can be arranged symmetrically one with respect to the other with respect to an axial plane of the machine body 10, in such a way to apply the displacement force on the sieve 25 in the first, or in the second, displacement direction 161, or 162, at two different points. For example, the first and the second actuation portions can be operated by the same driving portion. In this case, the first and the second actuation portions can be operatively connected to each other by driving members, for example by a transmission belt. Alternatively, each actuation portion can be driven by a respective driving portion.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A machine for extracting puree, or juice, from a food product, comprises a machine body provided with:
   an inlet for introducing the food product;
   an extraction section configured to separate, during an extraction configuration, said food product in a main product comprising said puree, or juice, and a waste product, within said extraction section a sieve having a cylindrical, or conical, shape being mounted, and provided with a plurality of holes, and a rotor having a cylindrical, or conical, shape positioned within said sieve and configured to rotate about a rotation axis in such a way to apply a centrifugal force on said food product to force the same against said sieve and separate the food product in said main product, which passes through said holes of said sieve, and is discharged through a first outlet, and said waste product, which, instead, does not pass through said holes of said sieve and is discharged through a second outlet positioned downstream of said first outlet with respect to the advancing direction of the food product along said extraction section;
   a motor operatively connected to said rotor and configured to cause said rotor to rotate about said rotation axis;
   a displacement device is, provided configured to move said sieve along a direction longitudinal to said machine body to position said sieve in a determined working position (Pe) when said extraction section does not work opera in said extraction configuration, said determined working position (Pe) being arranged between a predetermined first limit position (P1) and a predetermined second limit position (P2).

2. Machine for extracting puree, or juice, from a food product according to claim 1, wherein a first stop element is, furthermore, provided configured to stop mechanically said displacement of said sieve, when said sieve during said movement caused by said displacement device along said longitudinal direction in a first displacement direction, reaches said predetermined first limit position (P1).

3. Machine for extracting puree, or juice, from a food product according to claim 1, wherein, a second stop element is provided configured to stop mechanically said displacement of said sieve, when said sieve, during said displacement by said displacement device along said longitudinal direction in a second displacement direction, reaches said second limit position (P2).

4. Machine for extracting puree, or juice, from a food product according to claim 1, wherein an adjustment device is, furthermore, provided configured to set at least one between said first and said second limit positions (P1, P2).

5. Machine for extracting puree, or juice, from a food product according to claim 4, wherein said adjustment device is configured to cause at least one between said first and said second stop elements to translate along said longitudinal direction.

6. Machine for extracting puree, or juice, from a food product according to claim 1, wherein at least said first stop element is arranged to move between a blocking position, in which said first stop element is arranged to stop mechanically said displacement device when said sieve reaches said predetermined first limit position (P1), and an unblocking position, in which said first stop element is not arranged to stop mechanically said displacement device when said sieve reaches said predetermined first limit position (P1), whereby said sieve can go beyond said predetermined first limit position (P1), in such a way to subject said extraction section to an intervention of ordinary, or extraordinary, maintenance, when non opera in said extraction configuration.

7. Machine for extracting puree, or juice, from a food product according to claim 6, wherein at least a presence sensor is, furthermore, provided configured to detect if said first stop element is arranged in said blocking position, or not.

8. Machine for extracting puree, or juice, from a food product according to claim 7, wherein a control unit is, furthermore, provided operatively connected to said presence sensor and configured to prevent said motor to be switched on if said presence sensor detects that said first stop element is not arranged in said blocking position.

9. Machine for extracting puree, or juice, from a food product according to claim 1 wherein at least a position sensor is, furthermore, provided configured to detect the position (Pti) of said sieve or said displacement device instant by instant, and to send corresponding position data to a control unit in which said working position (Pe) is stored, said control unit being configured to stop said displacement device when said position data detected by said position sensor coincide with said working position (Pe).

10. Machine for extracting puree, or juice, from a food product according to claim 1 wherein said sieve is mounted on a support comprising a first and at least a second flange portions connected to each other by a connection portion, and wherein said displacement device is arranged to apply a determined force on said second flange portion in a first, or a second, direction, in order to displace said sieve, respectively, in said first, or said second displacement directions.

11. Machine for extracting puree, or juice, from a food product according to claim 10 wherein said displacement device comprises an actuation portion having a first end portion integral to said second flange portion of said support at which is arranged to apply a determined force oriented along said longitudinal direction in said first, or second, direction, in such a way to cause said sieve to move in the corresponding direction.

12. Machine for extracting puree, or juice, from a food product according to claim 11, wherein said displacement device provides a driving portion configured to drive said actuation portion to cause a movement along said longitudinal direction in said first, or in said second, displacement direction.

13. Machine for extracting puree, or juice, from a food product according to claim 12 wherein said driving portion provides a motor arranged to transmit said moto a said actuation portion by driving members.

14. Machine for extracting puree, or juice, from a food product according to claim 12 wherein said driving portion provides an actuator.

15. Machine for extracting puree, or juice, from a food product according to claim 8, wherein said control unit is arranged to store said predetermined first limit position (P1) and/or said second limit position (P2).

16. Machine for extracting puree, or juice, from a food product according to claim 11, wherein said actuation portion is, furthermore, provided with a second end provided with a contrast element, said first and second stop elements being provided with respective abutment surfaces against which said contrast element is arranged to abut when said sieve is moved in the first displacement direction, and in said second displacement direction, respectively.

17. Method for adjusting the position of a sieve in a machine for extracting puree, or juice, from a food product, said method comprising the steps of:
   providing a machine for extracting puree, or juice, from a food product comprising:
   a machine body having an inlet for introducing the food product;
   an extraction section configured to separate, during an extraction configuration, said food product into a main product comprising said puree, or juice, and a waste product, within said extraction section a sieve having a cylindrical, or conical, shape being mounted and provided with a plurality of holes, and a rotor having cylindrical, or conical, shape positioned within said sieve and configured to rotate about a rotation axis in such a way to apply a centrifugal force on said food product to force the same against said sieve and separate the same into said main product, which passes through said holes of said sieve, and is discharged through a first outlet, and said waste product, which, instead, does not pass through said holes of said sieve and is discharged through a second outlet positioned downstream of said first outlet with respect to the advancing direction of the food product in said extraction section;
   a motor operatively connected to said rotor and configured to cause said rotor to rotate about said rotation axis;
   a displacement step is, furthermore, provided to move said sieve with respect to said machine body along a longitudinal direction in a first and a second displacement directions to position said sieve in a determined working position (Pe) when said extraction section does not work in said extraction configuration, said determined working position (Pe) being positioned between a predetermined first limit position (P1) and a predetermined second limit position (P2).

18. Method according to claim 17, wherein a calibration step is, furthermore, provided to determine an ideal working position (Pe) of said sieve, at which the yield of said extraction machine is maximum.

19. Method according to claim 18, wherein at the end of said calibration step, a positioning step is, furthermore, provided to position said sieve at said ideal working position (Pe).

20. Method according to claim 18, wherein, during said calibration step, at least said second limit position (P2) of said sieve with respect to said machine body is, furthermore, determined.

* * * * *